United States Patent
Hoang et al.

(10) Patent No.: US 12,455,214 B1
(45) Date of Patent: Oct. 28, 2025

(54) SYSTEMS AND METHODS FOR ANOMALOUS SOUND DETECTION

(71) Applicant: FPT USA Corp., Richardson, TX (US)

(72) Inventors: Truong Van Hoang, Dong Nai (VN); Hong Van Thi Nguyen, San Diego, CA (US); Phong Xuan Nguyen, Ha Noi (VN)

(73) Assignee: FPT USA Corp., Richardson, TX (US)

( * ) Notice: Subject to any disclaimer, the term of this patent is extended or adjusted under 35 U.S.C. 154(b) by 0 days.

(21) Appl. No.: 19/250,564

(22) Filed: Jun. 26, 2025

(51) Int. Cl.
*G01M 99/00* (2011.01)
*G06N 3/0455* (2023.01)
(Continued)

(52) U.S. Cl.
CPC ........ *G01M 99/005* (2013.01); *G06N 3/0455* (2023.01); *G06N 3/0464* (2023.01); *G06N 3/084* (2013.01)

(58) Field of Classification Search
CPC ...... G06N 3/084; G06N 3/045; G06N 3/0455; G06N 3/047; G06N 3/08; G06N 3/088; G06N 3/044; G06N 3/0464; G06N 3/09; G06N 3/0442; G06N 3/0475; G06N 3/048; G06N 3/049; G06N 3/065; G06N 3/0895; G06N 3/096; G06N 3/098; G06N 3/10; G06N 7/01; G10L 25/30; G10L 15/063; G10L 15/16; G10L 15/26; G10L 21/0208; G10L 13/027; G10L 13/08; G10L 17/18; G10L 19/022; G10L 21/0308; G10L 25/51; G10L 13/02; G10L 13/033; G10L 13/047; G10L 15/02; G10L 15/22; G10L 15/34;
(Continued)

(56) References Cited

U.S. PATENT DOCUMENTS 10,706,856 B1 * 7/2020 Korjani ................... G10L 17/02
11,829,866 B1 * 11/2023 Feinstein ............. G06N 3/0455
(Continued)

FOREIGN PATENT DOCUMENTS

| CN | 111998936 A | 11/2020 |
|---|---|---|
| CN | 113792597 A | 12/2021 |
| CN | 115035913 A | 9/2022 |

*Primary Examiner* — Mohammad K Islam

(57) ABSTRACT

A computer-implemented method for training an anomaly detection neural network system comprising an encoder and a decoder is described. The method includes receiving training data comprising a plurality of training examples, each training example including a training audio waveform and a machine identity (ID); processing the training audio waveform to extract training audio features; receiving an environmental noise audio waveform; processing the environmental noise audio waveform to extract noise features; generating augmented features by combining the extracted training audio features and the noise features; processing, using the encoder, the augmented features to generate latent embeddings; processing, using the decoder, the latent embeddings to generate reconstructed audio features; processing, using a convolutional neural network, the augmented features to generate a predicted machine ID probability distribution; and adjusting, through backpropagation, the current values of the parameters of the encoder and the decoder to minimize an objective function.

16 Claims, 3 Drawing Sheets

(51) Int. Cl.
*G06N 3/0464* (2023.01)
*G06N 3/084* (2023.01)

(58) Field of Classification Search
CPC ......... G10L 17/00; G10L 17/02; G10L 19/02; G10L 2015/025; G10L 2021/0135; G10L 21/003; G10L 21/02; G10L 21/0232; G10L 21/038; G10L 21/06; G10L 25/06; G10L 25/18; G01M 99/005
See application file for complete search history.

(56) References Cited

U.S. PATENT DOCUMENTS

| | | | |
|---|---|---|---|
| 12,014,276 B2 * | 6/2024 | Mishra | G06N 3/084 |
| 12,067,758 B2 * | 8/2024 | Kosiorek | G06F 18/2415 |
| 12,190,896 B2 * | 1/2025 | Li | G10L 21/02 |
| 2019/0318725 A1 * | 10/2019 | Le Roux | G10L 17/00 |
| 2021/0082399 A1 * | 3/2021 | Kurata | G10L 15/34 |
| 2022/0155263 A1 * | 5/2022 | Inoue | G01N 29/14 |
| 2022/0284232 A1 * | 9/2022 | Yin | G06V 10/774 |
| 2022/0383887 A1 * | 12/2022 | Wang | G10L 25/51 |
| 2023/0035504 A1 * | 2/2023 | Lin | G10L 13/02 |
| 2023/0274758 A1 * | 8/2023 | Markhasin | G10L 25/18 704/232 |
| 2023/0343319 A1 * | 10/2023 | Hu | G06N 3/0442 |
| 2023/0368807 A1 * | 11/2023 | Liu | G10L 25/30 |
| 2024/0107079 A1 * | 3/2024 | Toderici | H04N 19/124 |
| 2024/0170003 A1 * | 5/2024 | Le Roux | G10L 25/30 |
| 2024/0378423 A1 * | 11/2024 | Gunnai | G06N 3/088 |
| 2025/0046316 A1 * | 2/2025 | Rose | H04M 3/568 |
| 2025/0117920 A1 * | 4/2025 | Erol | G06T 7/0008 |
| 2025/0173578 A1 * | 5/2025 | Rawat | G06N 3/045 |
| 2025/0182739 A1 * | 6/2025 | Nguyen Cong | G10L 13/08 |

* cited by examiner

SYSTEMS AND METHODS FOR ANOMALOUS SOUND DETECTION

BACKGROUND

This disclosure generally relates to neural network systems for anomalous sound detection.

Anomaly detection in sound plays a crucial role in various industrial applications, including product inspection, predictive maintenance, and audio surveillance. By analyzing sound patterns, organizations can identify irregularities that may indicate faults, malfunctions, or potential security threats. This capability is particularly valuable in environments where continuous monitoring is required to ensure operational efficiency and safety. Detecting abnormal sounds early allows for timely interventions, reducing the risk of unexpected failures and minimizing operational disruptions.

In industrial settings, machines often produce distinctive acoustic signatures, and deviations from these expected patterns can serve as early indicators of mechanical issues. Continuous monitoring of machine sounds enables early identification of potential failures, allowing companies to perform maintenance before significant damage occurs. This approach enhances reliability, extends equipment lifespan, and reduces costly downtime, contributing to improved productivity and safety in industrial operations.

SUMMARY

In general, one innovative aspect of the subject matter described in this specification can be embodied in a computer-implemented method for training an anomaly detection neural network comprising an encoder neural network, a decoder neural network, and a convolutional neural network. The encoder neural network has encoder parameters, the decoder neural network has decoder parameters, and the convolutional neural network has convolutional parameters. The method includes receiving training data comprising a plurality of training examples, each training example including (i) a training audio waveform that represents an audio signal and (ii) a machine identity (ID) associated with a machine that produced the audio signal. The method includes, for each training example of the plurality of training examples, performing the following steps: processing the training audio waveform to extract a plurality of training audio features; obtaining an environmental noise audio waveform; processing the environmental noise audio waveform to extract a plurality of noise features; generating augmented features by combining the plurality of extracted training audio features and the plurality of noise features; processing, using the encoder neural network in accordance with current values of the encoder parameters, the augmented features to generate a plurality of latent embeddings; processing, using the decoder neural network in accordance with current values of the decoder parameters, the plurality of latent embeddings to generate reconstructed audio features; processing, using a convolutional neural network in accordance with current values of the convolutional parameters, the augmented features to generate a predicted machine ID probability distribution, wherein the predicted machine ID probability distribution comprises, for each machine ID in a predetermined set of machine IDs, a probability value indicating a likelihood that the training audio waveform was produced by a machine associated with the corresponding machine ID; and adjusting, through backpropagation, the current values of the encoder parameters, the current values of the decoder parameters, and the current values of the convolutional parameters to minimize an objective function. The objective function includes a reconstruction loss and a cross-entropy loss, wherein the reconstruction loss represents a discrepancy between the reconstructed audio features and the extracted training audio features, and wherein the cross-entropy loss represents a discrepancy between the predicted machine ID distribution and a ground truth machine ID.

In some implementations, the method includes receiving a new audio waveform, processing the new audio waveform to extract new audio features; processing, using the trained encoder neural network in accordance with the adjusted values of the encoder parameters, the extracted new audio features to generate new latent embeddings; processing, using the trained decoder neural network in accordance with the adjusted values of the decoder parameters, the new latent embeddings to generate new reconstructed audio features; determining a distance error between the new reconstructed audio features and the extracted new audio features; determining that the distance error exceeds a predetermined threshold; and in response to a determination that the distance error exceeds the predefined threshold, determining that the new audio waveform is anomalous.

In some implementations, the method includes processing, using the convolutional neural network in accordance with the adjusted values of the convolutional parameters, the extracted new audio features to generate a new predicted machine ID probability distribution, wherein the new predicted machine ID probability distribution comprises, for each machine ID in the predetermined set of machine IDs, a probability value indicating a likelihood that the new audio waveform was produced by the corresponding machine ID;

and selecting, based on the new predicted machine ID probability distribution, a plurality of machine IDs having the top-k probability values among the machine IDs in the predetermined set of machine IDs.

In some implementations, the method includes transmitting an alert indicating that machines associated with machine IDs having the top-k probability values have likely produced the anomalous audio waveform.

In some implementations, the method includes automatically triggering a maintenance process to maintain the machines associated with the machine IDs having the top-k probability values.

In some implementations, the encoder neural network includes a plurality of dense neural network layers for down sampling the augmented features.

In some implementations, the decoder neural network includes a plurality of dense neural network layers for up sampling the augmented features.

In some implementations, each of the plurality of dense neural network layers of the decoder neural network is followed by a concatenation layer.

In some implementations, the reconstruction loss is a mean squared error (MSE) loss.

In some implementations, the augmented features are represented by a feature vector of size (T, 193), where T is a time dimension of the audio waveform.

Other innovative aspects of the subject matter described in this specification can be embodied in one or more systems and one or more non-transitory storage media encoded with instructions that when implemented by one or more computers cause the one or more computers to implement the system and method described above.

The subject matter described in this specification can be implemented in particular embodiments to achieve one or more of the following technical advantages.

Continuous machine condition monitoring is critical in industrial and transportation systems, as it enables near real-time detection of machine failures, facilitating predictive maintenance and minimizing unplanned downtime. Machine learning-based anomalous sound detection is a promising approach to factory automation, leveraging sound and vibration patterns to detect mechanical issues before they lead to catastrophic failures.

However, training machine learning models for anomalous sound detection presents significant challenges. In real-world environments, machine failures occur infrequently, and the ways in which failures manifest are highly diverse. Further, manufacturing companies often have a privacy policy that mandates keeping information in a private zone, whether on local systems or cloud-based servers. This policy limits the ability to collect sufficient data and share complete datasets for supervised training. As a result, collecting a sufficiently large dataset of anomalous sounds for supervised learning is impractical, time-consuming, and costly. The scarcity of failure data makes it difficult to train traditional supervised models that require labeled examples of both normal and anomalous sounds.

To overcome these technical challenges, the subject matter described in this specification provides an unsupervised learning technique for training an anomaly detection neural network using machine sounds without labels. In particular, the described techniques jointly train an encoder neural network, a decoder neural network, and a convolutional neural network of the anomaly detection neural network to minimize an objective function that includes a reconstruction loss and a cross-entropy loss. The reconstruction loss represents a discrepancy between the reconstructed audio features and the extracted training audio features, and the cross-entropy loss represents a discrepancy between the predicted machine ID distribution and a ground truth machine ID. By adjusting, through backpropagation, the current values of the encoder parameters of the encoder neural network, the current values of the decoder parameters of the decoder neural network, and the current values of the convolutional parameters of the convolutional neural network to minimize this unique objective function, the described techniques can train the anomaly detection neural network to achieve high prediction accuracy while eliminating the need for labeled anomalous data and labeled normal data. Further, the cross-entropy loss is utilized in the objective function during training to enhance robustness in performance of the anomaly detection neural network as the cross-entropy loss captures the distributional information of every machine ID. Nearly every ID from different branches yields distinct distance metric values. Additionally, this approach assists operators in adjusting threshold settings for each machine ID, improving their ability to differentiate between anomalies and normal conditions effectively.

By eliminating the need for labeled data, the described techniques significantly reduces data collection costs and enables the detection of unknown machine failures. The system learns to recognize deviations from normal operational sounds, allowing it to identify anomalies in factory environments without relying on predefined failure modes.

Furthermore, the system's ability to function in an unsupervised manner makes it highly adaptable to various industries and machine types. Instead of requiring manually labeled datasets for each specific machine, the model can be deployed across different industrial environments with minimal customization, making it a scalable and cost-effective solution for machine condition monitoring and predictive maintenance.

In addition, the subject matter described in this specification uses a noise injection technique during training of the anomaly detection neural network to enhance model robustness by improving generalization, mitigating overfitting, and increasing resilience to domain shifts. By exposing the neural network model to diverse noise patterns, it learns to differentiate between meaningful signals and environmental distortions, leading to better performance in real-world deployment. Unlike other augmentation methods that use simple masking values, the noise injection technique described in this specification incorporates realistic variations, enabling the model to handle complex and unpredictable conditions. In addition, by leveraging generative noise synthesis, the described technique allows for scalable augmentation without requiring extensive real-world data collection. Thus, by using the described techniques, the anomaly detection neural network described herein has higher accuracy in anomaly detection in noisy environments compared to existing systems, because the anomaly detection neural network is trained on a distribution more representative of its deployment conditions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an anomaly detection neural network system implemented as computer programs on one or more computers in one or more locations that is configured to detect anomalous sound, and a neural network training system implemented as computer programs on one or more computers in one or more locations that is configured to train the anomaly detection neural network system.

Figure 1:
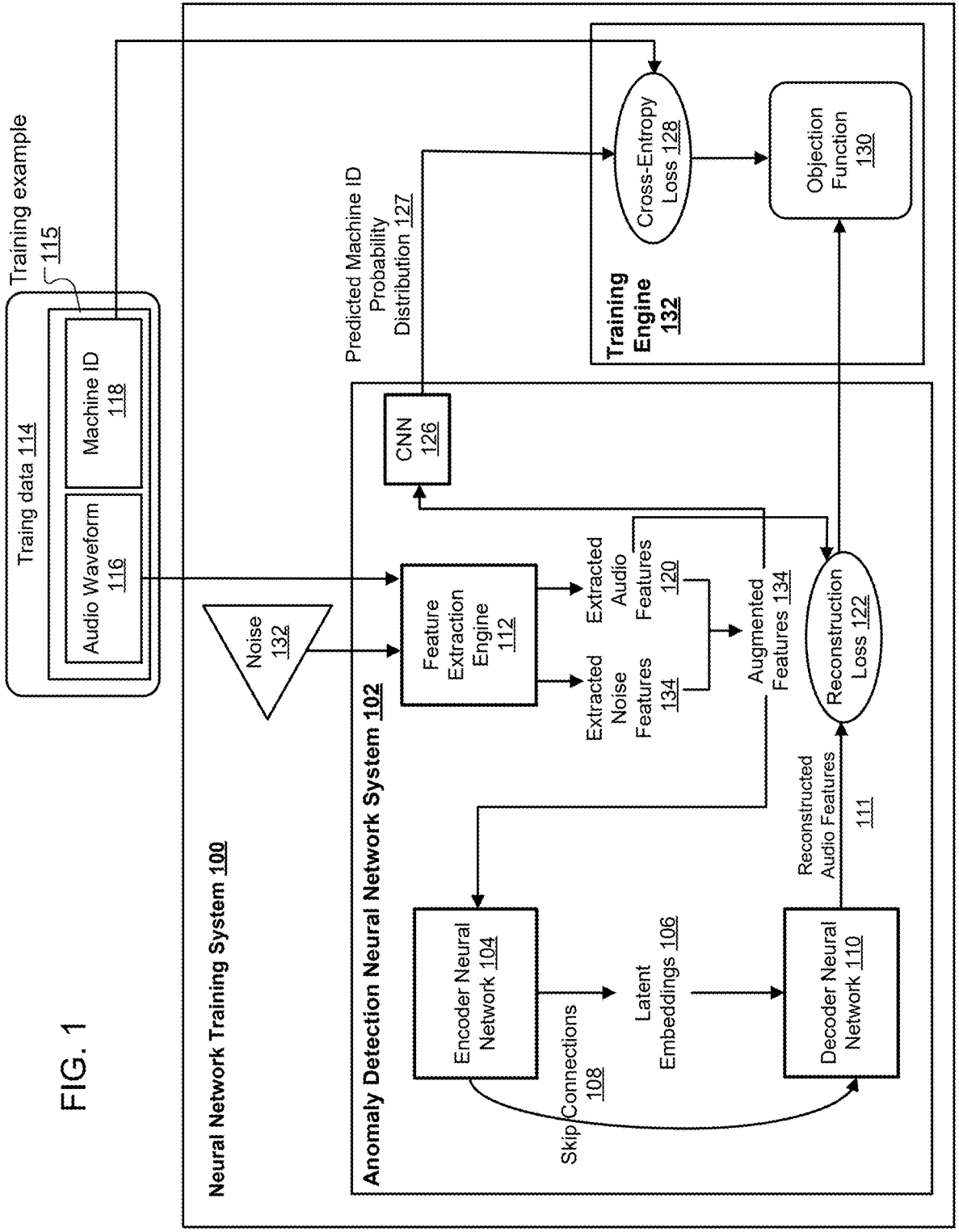
FIG. 1 shows an example neural network training system for training an anomaly detection neural network system to detect anomalous sound.

FIG. 1 shows an example neural network training system 100 for training an anomaly detection neural network system 102 to detect anomalous sound.

The neural network training system 100 and the anomaly detection neural network system 102 are examples of systems implemented as computer programs on one or more computers in one or more locations, in which the systems, components, and techniques described below can be implemented. The neural network training system 100 includes a training engine 132 and the anomaly detection neural network system 102. The training engine 132 is configured to train the anomaly detection neural network system 102 to perform an anomalous sound detection task. The training engine 132 can be implemented as one or more software modules or components, installed on one or more computers in one or more locations. In some cases, one or more computers will be dedicated to a particular engine; in other cases, multiple engines can be installed and running on the same computer or computers.

The anomaly detection neural network system 102 includes an encoder neural network 104 having a plurality of encoder parameters, a decoder neural network 110 having a plurality of decoder parameters, a feature extraction engine 112, and a convolutional neural network 126 having a plurality of convolutional parameters. The feature extraction engine 112 can be implemented as one or more software modules or components, installed on one or more computers in one or more locations. In some cases, one or more computers will be dedicated to a particular engine; in other cases, multiple engines can be installed and running on the same computer or computers.

To train the anomaly detection neural network system 102, the neural network training system 100 is configured to receive training data 114 that includes a plurality of training examples. Each of the training example 115 includes a training audio waveform 116 and a machine ID 118 associated with a machine that generated a sound signal represented by the audio waveform 116.

The audio waveform 116 is a visual representation of a sound signal, depicting how the amplitude (loudness) of the sound varies over time. The audio waveform can be displayed as a two-dimensional graph, where the x-axis represents time and the y-axis represents amplitude. The shape of the waveform corresponds to the variations in air pressure that create sound, with peaks indicating high pressure and troughs indicating low pressure.

For each of the training examples, the system 100 processes the audio waveform 116 using the feature extraction engine 112 of the anomaly detection neural network system 102. The feature extraction engine 112 is configured to process the audio waveform 116 to extract audio features 120.

In some implementations, the engine 112 extracts multiple audio features and combine them into a final representation of the extracted audio features (hereafter referred to as a "final mixture scale feature").

The feature extraction process operates using a sliding window mechanism, which segments an audio signal into fixed-length overlapping intervals to ensure a continuous and structured analysis of the signal. For example, in some implementations, the feature extraction engine 112 extracts features from three-second audio segments, meaning that at each step, a 3-second window of audio is taken and processed into a final mixture scale feature with dimensions (T, 193). However, within this three-second window, the system does not treat the entire duration as a single unit; instead, it further divides the audio into smaller time frames, for example, on the order of 10 to 50 milliseconds each. These time frames allow for a finer resolution of spectral and acoustic feature extraction, capturing short-term variations in the signal. The extracted features from these time frames are then aggregated to form the overall representation for the full 3-second segment.

For example, in some implementations, the engine 112 processes the audio waveform 116 of a 3-second segment to generate a final mixture scale feature as follows:

Step 1: Compute Log-Mel Spectrogram (T, 128)

The Log-Mel Spectrogram captures the frequency content of the audio signal using the Mel scale, which aligns more closely with human auditory perception.

The engine 112 first transforms the audio waveform into a spectrogram using the Short-Time Fourier Transform (STFT), which decomposes the signal into time-frequency components. The STFT produces a power spectrogram, representing how energy is distributed across different frequencies over time.

The spectrogram is then passed through a Mel filter bank, which groups the frequency components into bands corresponding to the Mel scale. This results in a Mel spectrogram (M), where each row represents a Mel-frequency band, and each column represents a time frame.

The engine 112 then convert the Mel-Scale spectrogram to Log-Mel energies. Since raw spectrogram values have a large dynamic range, they are converted to a logarithmic scale using the formula:

$$\text{Log-}Mel = 10 \times \log_{10}(\max(M, \in)),$$

where $\in = 2.220446049250313e{-}16$ is a small constant used to prevent numerical instability when computing the logarithm.

The result is a Log-Mel spectrogram with dimensions (T, 128), where T is the number of time frames and 128 is the number of Mel-frequency bands.

Step 2: Compute Mel-Frequency Cepstral Coefficients (MFCC) (T, 40)

The engine 112 uses MFCCs to capture the spectral envelope of the sound. To compute MFCC from the Log-Mel Spectrogram, the engine 112 transforms the Log-Mel spectrogram using the Discrete Cosine Transform (DCT). The DCT removes correlations between frequency bands, resulting in a more compact representation. The first 40 coefficients are retained, as they contain the most meaningful spectral information.

To make the features more robust, the engine 112 computes the mean of MFCC over the time dimension. The final output is an MFCC representation of size (T, 40).

Step 3: Compute Chroma Feature (T, 12)

The Chroma feature captures harmonic and tonal information, particularly useful for analyzing music and pitch-related aspects of sound.

The engine 112 computes Chromogram from the power spectrogram (computed via STFT in Step 1). The frequency bins are mapped into 12 chroma bins, each corresponding to a musical pitch class (e.g., C, C#, D, etc.). The chroma features represent how much energy is present in each of these 12 pitch classes across time.

The engine 112 computes the mean of chroma values over the time frames to create a stable representation. The resulting Chroma feature has a dimension of (T, 12).

Step 4: Compute Spectral Contrast (T, 7)

Spectral contrast measures the difference in energy between spectral peaks and valleys, making it useful for distinguishing different sound textures. The engine 112 computes spectral contrast from the power spectrogram.

First, the power spectrogram is divided into 7 frequency bands. Within each band, the contrast between the highest and lowest spectral energies is computed. This highlights differences between tonal and noisy components of the sound.

The engine 112 then computers the mean of Spectral Contrast. The mean values are calculated over time to produce a stable representation. The final Spectral Contrast feature has a size of (T, 7).

Step 5: Compute Tonnetz Feature (T, 6)

The Tonnetz feature captures harmonic relationships and is useful for analyzing music and tonal structures. The engine 112 computes Tonnetz Features from Chroma representation. The chroma features computed in Step 3 are further processed using the Harmonic Network (Tonnetz) transformation. This transformation maps pitch relationships onto a geometric space that encodes harmonic properties.

The engine 112 computes the mean of Tonnetz features. The mean values are computed over time to obtain a stable feature representation. The final Tonnetz feature has a size of (T, 6).

Step 6: Combine all Features into a Final Mixture Scale Feature Having a Size of (T, 193

After computing all individual features, the engine 112 combines all features into a single representation. The engine 112 concatenates the extracted features along the feature dimension to generate a final mixture scale feature which is a representation of the extracted features:

Final mixture scale feature $M$=Concatenate([Log-Mel($T$-128),MFCC($T$,40),Chroma($T$,12),Spectral Contrast($T$,7),Tonnetz($T$,6)]).

This results in a final mixture scale feature M of size (T, 193).

In some implementations, instead of stacking features, an attention-based neural network can be used to learn an optimal weighted combination of the extracted features. The network assigns different attention weights to each feature type, allowing the system to dynamically emphasize the most important features for a given task. In these implementations, the final mixture scale feature remains of size (T, 193) but can be a more refined, trainable representation of the extracted features.

Noise Injection During Training

To enhance the robustness of the anomaly detection neural network system 102, the neural network training system 100 obtains a noise audio signal 132 and uses it for training the anomaly detection neural network system 102.

One of the challenges with traditional noise injection techniques is that they may not fully capture the complexity of noise environments in industrial settings. Simply masking audio features with zero or mean values does not represent the variability and richness of actual noise, potentially limiting the anomaly detection system's ability to generalize. To overcome this challenge, the system 100 uses more sophisticated noise injection methods. The noise injected during training can be obtained using different methods to ensure the system 102 encounters a diverse range of noise patterns during training:

1. Recorded Environmental Noise: The noise used for augmentation can be sourced directly from the industrial environments. For example, sounds such as wind, door opening/closing, people walking, the hum of machinery, air conditioning, or even human voices may be recorded in these environments. This recorded noise captures the true disturbances that could interfere with the anomaly detection task. By using this real-world noise for training, the anomaly detection neural network system 102 becomes more adept at distinguishing between actual anomalies and common environmental sounds that might otherwise be misclassified.
2. Synthetic Noise Using Generative Models: To further enhance the diversity of the training data, the system 100 can generate synthetic noise using models such as generative AI models, generative adversarial networks, or diffusion models. These techniques can take environmental sounds, like the noise of a door closing or footsteps, and generate novel variations that simulate different conditions or disturbances that may not have been present in the initial training data. For instance, a generative AI model can be prompted to produce synthetic audio based on prompts such as "babble", "AC noise", "bell ringing", "loud machine buzz" or "footsteps on concrete," resulting in noise that mimics specific industrial environments.
3. Noise Blending: The system 100 can also introduce noise by blending synthetic environmental noise data with normal audio data. The system 100 may apply a weighting factor (a) to the synthetic environment noise data and mix the result with normal audio samples. This ensures that the normal data, which represents the baseline behavior of the system, is augmented by the injected noise, effectively teaching the anomaly detection neural network system 102 to recognize patterns amidst disturbances. This approach simulates a more realistic environment where normal operations are often accompanied by various background noises.

The above noise injection techniques solve the domain shift problem (where the distribution of data changes between training and deployment environments) which can affect the anomaly detection system performance. The noise augmentation strategies used in this disclosure help mitigate this issue by incorporating noise characteristics specific to the factory domain. This ensures that the system 102 learns to detect anomalies even in environments with varying noise conditions, improving its performance when deployed in different real-world scenarios.

The feature extraction engine 112 processes a noise audio waveform representing the noise audio signal 132 to extract noise features 134. The engine 112 can process the noise audio waveform to generate a final noise feature that represents the extracted noise features 134 using the same method as it applies to the audio waveform 116, as described above.

The anomaly detection neural network system 102 combines the final mixture scale feature that represents the extracted audio features 120 and the final noise feature that represents the extracted noise features 134 to generate augmented features 134.

The encoder neural network 104 is configured to receive the augmented features 134 and process the augmented features in accordance with current values of the encoder parameters to generate a plurality of latent embeddings 106.

In particular, the encoder neural network 104 is configured to compress high-dimensional audio feature data into a compact latent representation. The encoder neural network 104 includes N fully connected (dense) layers, which progressively reduce the dimensionality of the input mixture scale feature M (e.g., a mixture scale feature of shape (T,193)). For instance, in a five-layer configuration, the input layer of the encoder neural network 104 begins with 193 channels, followed by successive layers with 128, 128, 128, and finally 8 channels. Each layer applies non-linear activation functions, such as ReLU, to introduce non-linearity and capture complex feature interactions. The encoder neural network 104 serves as a downsampling mechanism, learning a latent space representation that retains essential characteristics of the input while filtering out redundant information. This latent representation, including the plurality of latent embeddings 106, has a significantly lower dimensionality (e.g., 8 channels). The latent embeddings 106 are then passed to the decoder neural network 110 for reconstruction.

The decoder neural network 110 is configured to receive the plurality of latent embeddings 106 and to process, in accordance with current values of the decoder parameters, the plurality of latent embeddings 106 to generate reconstructed audio features 111.

More specifically, the decoder neural network 110 is configured to reconstruct the original final mixture scale feature M (that represents reconstructed audio features 111) from the latent embeddings 106, effectively reversing the encoding process. Similar to the encoder neural network 104, the decoder neural network 110 includes N fully connected (dense) layers that progressively upsample the latent space back to its original dimensionality. However, unlike the encoder, the decoder incorporates N−1 concatenation layers, which act as skip connections 108 by preserving intermediate outputs from the encoder neural network 104's corresponding layers. This unique architecture ensures that fine-grained details lost during encoding are retained during reconstruction, improving the anomaly detection neural network system 102's ability to faithfully reconstruct the original input. For example, in a five-layer decoder configuration, the input begins with 8 channels and expands through successive layers with 128, 256, 256, and finally 193 channels to match the original input size. These skip connections enhance the reconstruction quality by allowing low-level feature information from the encoder to directly influence the decoder.

To further enhance robustness and improve classification accuracy, the anomaly detection neural network system 102 integrates the convolutional neural network (CNN) 126, which is configured to determine, given input audio features, the machine to which the corresponding audio signal (represented by an audio waveform) belongs. The CNN 126 employs multiple layers of convolutional operations to extract both low-level spectral patterns and high-level temporal dependencies from the audio features. Each convolutional layer applies a set of learnable filters that detect distinctive frequency components and time-domain variations, enabling the CNN to differentiate between machines based on their unique acoustic signatures. To improve training stability and generalization, batch normalization is applied after each convolutional layer, normalizing activations to mitigate internal covariate shifts. Non-linear activation functions introduce the necessary complexity for the model to capture subtle variations in machine-generated audio. In addition, pooling layers, such as max pooling or average pooling, reduce the spatial dimensions of feature maps, lowering computational cost while preserving key distinguishing features.

As shown in FIG. 1, the CNN 126 processes the augmented features 134 in accordance with the current values of its convolutional parameters to generate a predicted machine ID probability distribution 127. The CNN architecture may include residual or skip connections to facilitate gradient flow, allowing deeper networks to train effectively without vanishing gradient issues. The extracted hierarchical features are passed through fully connected layers, transforming them into a compact representation for classification. A SoftMax activation function in the final layer converts the CNN's raw outputs into a probability distribution over a predetermined set of machine IDs. In some implementations, the machine ID with the highest probability value is selected as the most likely source of the audio waveform 116. In some other implementations, a plurality of machine IDs (e.g., k machine IDs having the top-k probability values) are selected as the most likely source of the audio waveform 116. By leveraging this structured feature extraction and classification process, the CNN 126 enhances anomaly detection accuracy while remaining robust to background noise, environmental factors, and variations in machine operation.

To jointly train the encoder neural network 104, the decoder neural network 110, and the convolutional neural network 126, the training engine 132 is configured to adjust, through backpropagation, the current values of the encoder parameters, the current values of the decoder parameters, and the current values of the convolutional parameters to minimize an objective function 130.

The objective function 130 includes a reconstruction loss 122 and a cross-entropy loss 128. The reconstruction loss 122 represents a discrepancy between the reconstructed audio features and the extracted training audio features. The cross-entropy loss 128 represents a discrepancy between the predicted machine ID distribution and a ground truth machine ID.

In some implementations, the objective function 130 is denoted as Loss (y, ŷ) and is computed based on the following equation:

$$Loss(y, \hat{y}) = L_{recon}(M, M_{recon}) + \alpha CE(y, \hat{y}),$$

where $L_{recon}$ (M, $M_{recon}$) is the reconstruction loss 122, CE (y, ŷ) is the cross-entropy loss 128, y is the machine ID associated with the machine that produced the audio signal represented by the audio waveform 116, ŷ is the predicted machine ID probability distribution 127, M is the final mixture scale feature that represents the extracted audio features 120, $M_{recon}$ is the reconstructed audio features 111, and α represents a weighting factor in the aggregation of reconstruction loss and the cross-entropy loss. For example, in some implementations, α is 0.3.

The reconstruction loss 122 is computed based on the following equation:

$$L_{recon}(M, M_{recon}) = \frac{1}{T \times 193} \sum_{t=1}^{T} \|M_t - M_{recont}\|_2,$$

where T is the number of time frames of the audio waveform 116, $M_t$ is the part of the final mixture scale feature (that represents the extracted audio features 120) that corresponds to the t time frame, $M_{recont}$ is the part of the reconstructed audio features corresponding to the t time frame, and $\|.\|_2$ is $l_2$ norm.

The cross-entropy loss 128 is computed based on the following equation:

$$CE(y, \hat{y}) = -\sum_{c=1}^{c} y_c \log(\hat{y}_c),$$

where c is a machine ID that belongs to the set of C machine IDs.

The training process is described in more detail below with reference to FIG. 3.

Once the anomaly detection neural network has been trained, the anomaly detection neural network has a set of trained values of the parameters and can be used to detect anomalous sound and predict the machine that produced the anomalous sound, as described in detail below with reference to FIG. 2.

Figure 2:
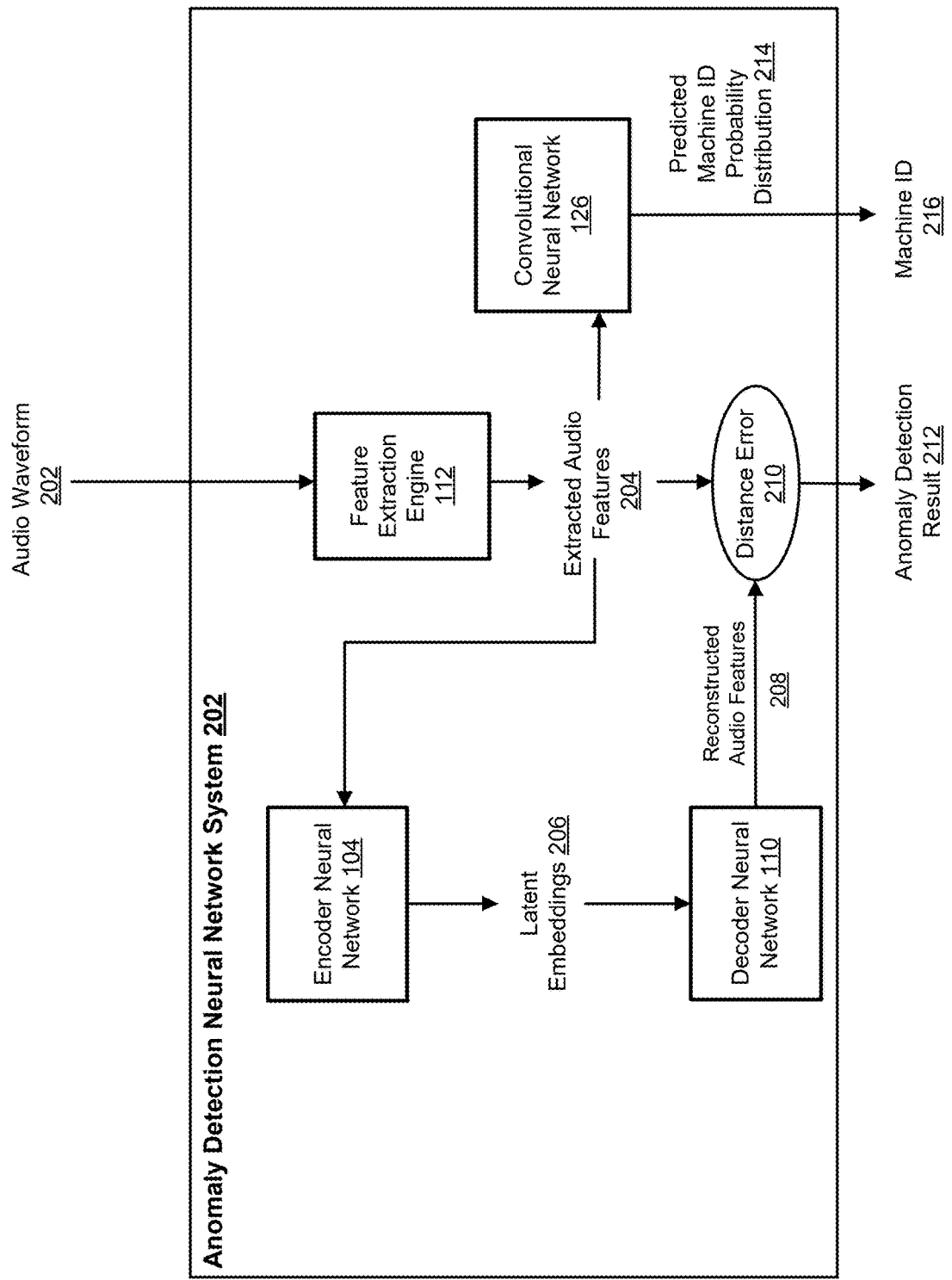
FIG. 2 illustrates an example anomaly detection neural network system and its operations for detecting anomalous sound.

FIG. 2 illustrates an example anomaly detection neural network system 202 and its operations for detecting anomalous sound.

After being trained, the system 202 receives a new audio waveform 116 and processes the new audio waveform 116 using the feature extraction engine 112 to extract new audio features 204, represented by a final mixture scale feature.

The trained encoder neural network 104 processes the extracted new audio features 204 in accordance with the trained values of the encoder parameters to generate new latent embeddings 206.

The trained decoder neural network 110 processes the new latent embeddings 206 in accordance with the trained values of the decoder parameters to generate a reconstructed mixture scale feature that represents the new reconstructed audio features 208. The system 202 determines a discrepancy between the extracted new audio features and the new reconstructed audio features by determining a distance error 210 between the final mixture scale feature representing the extracted new audio features and the new reconstructed audio features.

The system 202 determines whether the distance error 210 exceeds a predetermined threshold. If the distance error 210 exceeds the predefined threshold, the system 202 outputs an anomaly detection result 212 indicating that the sound signal represented by the new audio waveform 202 is anomalous. If the distance error 210 does not exceed the predefined threshold, the system 202 outputs an anomaly detection result 212 indicating that the sound signal represented by the new audio waveform 202 is normal.

The system 202 processes, using the convolutional neural network 126 in accordance with the trained values of the convolutional parameters, the extracted new audio features 204 to generate a new predicted machine ID probability distribution 214. The new predicted machine ID probability distribution 214 includes, for each machine ID in the predetermined set of machine IDs, a probability value indicating a likelihood that the new audio waveform was produced by the corresponding machine ID. The system 202 selects, based on the new predicted machine ID probability distribution 214, a machine ID 216 having the highest probability value among the machine IDs in the predetermined set of machine IDs. The machine associated with the machine ID 216 having the highest probability value is identified as the most likely source of the sound signal represented by the audio waveform 202.

When the distance error 210 exceeds the predefined threshold, in some implementations, the system 202 transmits an alert indicating that a machine associated with the identified machine ID having the highest probability value likely produced the anomalous sound signal. In some other implementations, the system 202 automatically triggers a maintenance process to maintain a plurality of machines (k machines) associated with a plurality of machine IDs (k machine IDs) having the top-k probability values.

For example, if an industrial air compressor begins to exhibit abnormal vibrations that produce an unusual sound pattern, the system can detect this anomaly in real-time. Upon receiving an audio waveform from a sensor placed near the compressor, the system 202 extracts relevant audio features and processes them through the trained encoder neural network, generating latent embeddings that capture essential characteristics of the sound. These embeddings are then passed through the trained decoder neural network to reconstruct the audio features. If the system 202 detects a significant discrepancy between the reconstructed and original features, which indicates an anomaly, the compressor is flagged as potentially malfunctioning.

In addition, as described above, the system 202 may classify the source of the anomalous sound by processing the extracted audio features through the trained convolutional neural network 126. For example, in a factory setting with multiple machines such as conveyor belts, hydraulic presses, and robotic arms, the system generates a probability distribution across a predetermined set of machine IDs. As an example, if the highest probability corresponds to the air compressor, the system identifies it as the most likely source of the anomalous sound. As another example, if the top two probability values correspond to a conveyor belt and a robotic arm, the system identifies these two machines as the most likely source of the anomalous sound.

Figure 3:
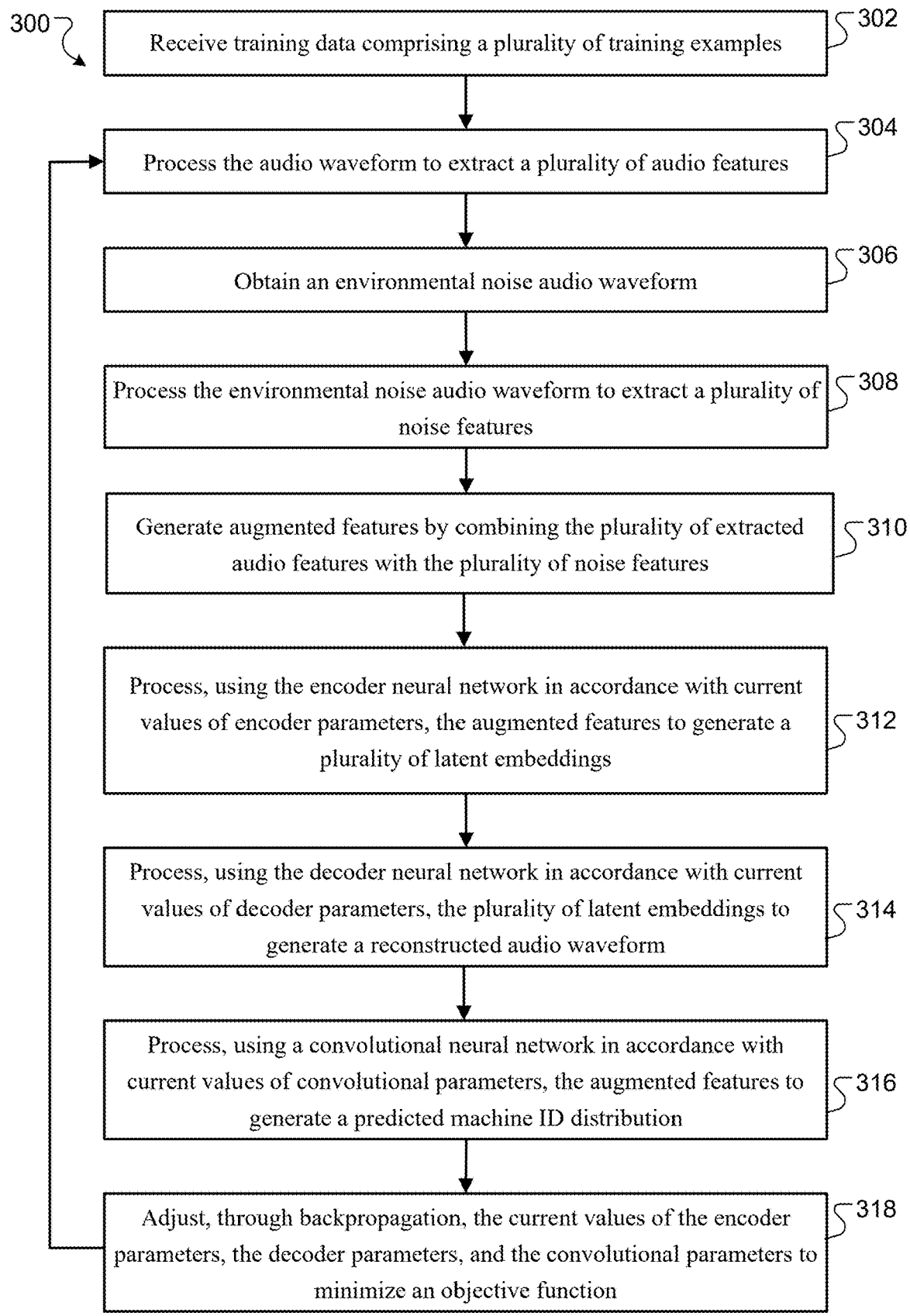
FIG. 3 is a flow diagram of an example process for training an anomaly detection neural network system to detect anomalous sound.

FIG. 3 is a flow diagram of an example process 300 for training an anomaly detection neural network system to detect anomalous sound.

For convenience, the process 300 will be described as being performed by a system of one or more computers located in one or more locations. For example, a neural network system, e.g., the neural network training system 100 of FIG. 1, appropriately programmed in accordance with this specification, can perform the process 300.

The system receives training data comprising a plurality of training examples (step 302). Each training example includes a training audio waveform and a ground-truth machine identity (ID) associated with a machine that produced the audio waveform.

For each training example of the plurality of training examples, the system performs steps 304-318 as follows.

The system processes the training audio waveform to extract a plurality of training audio features (step 304).

The system obtains an environmental noise audio waveform (step 306).

The system processes the environmental noise audio waveform to extract a plurality of noise features (step 308).

The system generates augmented features by combining the plurality of extracted training audio features and the plurality of noise features (step 310). In some implementations, the augmented features are represented by a feature vector of size (T, 193), where T is a time dimension of the audio waveform.

The system processes, using the encoder neural network in accordance with current values of the encoder parameters, the augmented features to generate a plurality of latent embeddings (step 312). In some implementations, the encoder neural network comprises a plurality of dense neural network layers for down sampling the augmented features The system processes, using the decoder neural network in accordance with current values of the decoder parameters, the plurality of latent embeddings to generate reconstructed audio features (step 314). In some implementations, the decoder neural network comprises a plurality of dense neural network layers for up sampling the augmented features. In some implementations, each of the plurality of dense neural network layers of the decoder neural network is followed by a concatenation layer.

The system processes, using a convolutional neural network in accordance with current values of the convolutional parameters, the augmented features to generate a predicted machine ID probability distribution (step 316). The predicted machine ID probability distribution comprises, for each machine ID in a predetermined set of machine IDs, a probability value indicating a likelihood that the training audio waveform was produced by the corresponding machine ID.

The system adjusts, through backpropagation, the current values of the encoder parameters, the current values of the decoder parameters, and the current values of the convolutional parameters to minimize an objective function (step 318). The objective function includes a reconstruction loss and a cross-entropy loss. The reconstruction loss represents a discrepancy between the reconstructed audio features and the extracted training audio features. The cross-entropy loss represents a discrepancy between the predicted machine ID distribution and a ground truth machine ID.

In some implementations, the reconstruction loss is a mean squared error (MSE) loss.

To minimize the objective function, the system uses backpropagation and gradient descent. Backpropagation is the technique used to calculate the gradient of the objective function with respect to the neural network model's current weights (i.e., current values of parameters of the encoder neural network, the decoder neural network and the convolutional neural network of the anomaly detection neural network system), effectively identifying how much each weight contributes to the prediction errors (i.e., the reconstruction loss and the cross-entropy loss).

The calculated gradients are then used in gradient descent, an optimization algorithm that adjusts the model's weights incrementally to minimize the loss. In gradient descent, the current values of the parameters of the code generation neural network are updated by moving in the direction of the negative gradient, allowing the model to gradually learn the optimal set of parameter values that improve its predictions over time. This iterative process ensures that the model becomes increasingly accurate at detecting anomalous sound and the machine that produced the anomalous sound as training progresses.

In some implementations, after initial training, the anomaly detection neural network system undergoes fine-tuning to improve its performance. Fine-tuning involves training the model on a smaller, more focused dataset that includes both general and domain-specific audio examples and test cases. The fine-tuning process ensures that the model refines its ability to generalize to real-world scenarios by adapting to variations in machine sounds that were not fully captured during initial training. This process may involve adjusting the learning rate, modifying specific layers of the network, or employing transfer learning techniques to leverage pre-trained weights. By incorporating domain-specific examples, the fine-tuning phase helps the model differentiate between normal machine sounds and subtle anomalies that could indicate mechanical issues or failures.

Once the anomaly detection neural network has been trained, the anomaly detection neural network has a set of trained values of the parameters and can be used to detect anomalous sound and predict the machine that produced the anomalous sound.

In particular, in some implementations, the system receives a new audio waveform, and processes the new audio waveform to extract new audio features. The system processes, using the trained encoder neural network in accordance with the adjusted values of the encoder parameters, the extracted new audio features to generate new latent embeddings. The system processes, using the trained decoder neural network in accordance with the adjusted values of the decoder parameters, the new latent embeddings to generate new reconstructed audio features. The system determines a distance error between the new reconstructed audio features and the extracted new audio features. The system determines that the distance error exceeds a predetermined threshold; and in response to a determination that the distance error exceeds the predefined threshold, the system determines that the new audio waveform is anomalous.

In some implementations, the system processes, using the convolutional neural network in accordance with the adjusted values of the convolutional parameters, the extracted new audio features to generate a new predicted machine ID probability distribution. The new predicted machine ID probability distribution includes, for each machine ID in the predetermined set of machine IDs, a probability value indicating a likelihood that the new audio waveform was produced by the corresponding machine ID. The system selects, based on the new predicted machine ID probability distribution, a plurality of machine IDs having the top-k probability values among the machine IDs in the predetermined set of machine IDs.

In some implementations, the system may transmit an alert indicating that a machine associated with the selected machine ID having the highest probability value likely produced the anomalous audio waveform. In some implementations, the method includes transmitting an alert indicating that a plurality of machines associated with a plurality of machine IDs having the top-k probability values have likely produced the anomalous audio waveform.

In some implementations, the system may automatically trigger a maintenance process to maintain the machines associated with the machine IDs having the top-k probability values. In some other implementations, the system may automatically trigger a maintenance process to maintain the machine associated with the machine ID having the highest probability values Once an anomaly is confirmed and a specific machine is identified, the system can take further action. In some implementations, it may transmit an alert to maintenance personnel, providing details about the detected issue and its severity. In more advanced setups, the system may automatically trigger a maintenance workflow such as scheduling a technician visit or even shutting down the machine if the anomaly suggests an imminent failure. For example, if the detected anomaly corresponds to a misalignment in the compressor's internal components, the system could notify operators to inspect and realign the parts before further damage occurs. This proactive approach minimizes downtime, prevents costly repairs, and ensures operational efficiency in industrial environments.

The anomaly detection neural network system can continuously improve through online learning, where it periodically updates its parameters based on newly acquired data from deployed environments. This adaptive approach allows the model to remain robust against evolving machine conditions, ensuring that it maintains high accuracy in detecting anomalies and correctly associating them with the corresponding machine. Over time, this iterative refinement reduces false positives and false negatives, making the neural network a reliable tool for predictive maintenance and fault detection in industrial applications.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for training an anomaly detection neural network comprising an encoder neural network, a decoder neural network, and a convolutional neural network, wherein the encoder neural network has encoder parameters, the decoder neural network has decoder parameters, and the convolutional neural network has convolutional parameters, the method comprising:

receiving training data comprising a plurality of training samples, each training sample including (i) a training audio waveform that represents an audio signal and (ii) a machine identity (ID) associated with a machine that produced the audio signal;

for each training sample of the plurality of training samples, performing the following steps:
  processing the training audio waveform to extract a plurality of training audio features;
  obtaining, by a sensor, an environmental noise audio waveform;
  processing the environmental noise audio waveform to extract a plurality of noise features;
  generating augmented features by combining the plurality of extracted training audio features and the plurality of noise features;
  processing, using the encoder neural network in accordance with current values of the encoder parameters, the augmented features to generate a plurality of latent embeddings;
  processing, using the decoder neural network in accordance with current values of the decoder parameters, the plurality of latent embeddings to generate reconstructed audio features;
  processing, using a convolutional neural network in accordance with current values of the convolutional parameters, the augmented features to generate a predicted machine ID probability distribution, wherein the predicted machine ID probability distribution comprises, for each machine ID in a predetermined set of machine IDs, a probability value indicating a likelihood that the training audio waveform was produced by a machine associated with the corresponding machine ID; and
  adjusting, through backpropagation, the current values of the encoder parameters, the current values of the decoder parameters, and the current values of the convolutional parameters to minimize an objective function, wherein the objective function comprises a reconstruction loss and a cross-entropy loss, wherein the reconstruction loss represents a discrepancy between the reconstructed audio features and the extracted training audio features, and wherein the cross-entropy loss represents a discrepancy between the predicted machine ID distribution and a ground truth machine ID;

receiving a new audio waveform;

processing the new audio waveform to extract new audio features;

processing, using the convolutional neural network in accordance with the adjusted values of the convolutional parameters, the extracted new audio features to generate a new predicted machine ID probability distribution, wherein the new predicted machine ID probability distribution comprises, for each machine ID in the predetermined set of machine IDs, a probability value indicating a likelihood that the new audio waveform was produced by a machine associated with the corresponding machine ID;

selecting, based on the new predicted machine ID probability distribution, a plurality of machine IDs having the top-k probability values among the machine IDs in the predetermined set of machine IDs; and transmitting an alert indicating that at least one machine associated with the plurality of machine IDs having the top-k probability values has likely produced the anomalous audio waveform.

2. The method of claim 1, further comprising:
processing, using the trained encoder neural network in accordance with the adjusted values of the encoder parameters, the extracted new audio features to generate new latent embeddings;
processing, using the trained decoder neural network in accordance with the adjusted values of the decoder parameters, the new latent embeddings to generate new reconstructed audio features;
determining a distance error between the new reconstructed audio features and the extracted new audio features;
determining that the distance error exceeds a predetermined threshold; and
in response to a determination that the distance error exceeds the predefined threshold, determining that the new audio waveform is anomalous.

3. The method of claim 1, further comprising:
automatically triggering a maintenance process to maintain the plurality of machines associated with the machine IDs having the top-k probability values.

4. The method of claim 1, wherein the encoder neural network comprises a plurality of dense neural network layers for down sampling the augmented features.

5. The method of claim 1, wherein the decoder neural network comprises a plurality of dense neural network layers for up sampling the augmented features.

6. The method of claim 5, wherein each of the plurality of dense neural network layers of the decoder neural network is followed by a concatenation layer.

7. The method of claim 1, wherein the reconstruction loss is a mean squared error (MSE) loss.

8. The method of claim 1, wherein the augmented features are represented by a feature vector of size (T, 193), where T is a time dimension of the audio waveform.

9. A system comprising one or more computers and one or more storage devices storing instructions that, when executed by the one or more computers, cause the one or more computers to perform operations for training an anomaly detection neural network comprising an encoder neural network, a decoder neural network, and a convolutional neural network, wherein the encoder neural network has encoder parameters, the decoder neural network has decoder parameters, and the convolutional neural network has convolutional parameters, the operations comprising:
receiving training data comprising a plurality of training samples, each training sample including (i) a training audio waveform that represents an audio signal and (ii) a machine identity (ID) associated with a machine that produced the audio signal;
for each training sample of the plurality of training samples, performing the following steps:
processing the training audio waveform to extract a plurality of training audio features;
obtaining, using a sensor, an environmental noise audio waveform;
processing the environmental noise audio waveform to extract a plurality of noise features;
generating augmented features by combining the plurality of extracted training audio features and the plurality of noise features;
processing, using the encoder neural network in accordance with current values of the encoder parameters, the augmented features to generate a plurality of latent embeddings;
processing, using the decoder neural network in accordance with current values of the decoder parameters, the plurality of latent embeddings to generate reconstructed audio features;
processing, using a convolutional neural network in accordance with current values of the convolutional parameters, the augmented features to generate a predicted machine ID probability distribution, wherein the predicted machine ID probability distribution comprises, for each machine ID in a predetermined set of machine IDs, a probability value indicating a likelihood that the training audio waveform was produced by a machine associated with the corresponding machine ID; and
adjusting, through backpropagation, the current values of the encoder parameters, the current values of the decoder parameters, and the current values of the convolutional parameters to minimize an objective function,
wherein the objective function comprises a reconstruction loss and a cross-entropy loss, wherein the reconstruction loss represents a discrepancy between the reconstructed audio features and the extracted training audio features, and wherein the cross-entropy loss represents a discrepancy between the predicted machine ID distribution and a ground truth machine ID;
receiving a new audio waveform;
processing the new audio waveform to extract new audio features;
processing, using the convolutional neural network in accordance with the adjusted values of the convolutional parameters, the extracted new audio features to generate a new predicted machine ID probability distribution, wherein the new predicted machine ID probability distribution comprises, for each machine ID in the predetermined set of machine IDs, a probability value indicating a likelihood that the new audio waveform was produced by a machine associated with the corresponding machine ID;
selecting, based on the new predicted machine ID probability distribution, a plurality of machine IDs having the top-k probability values among the machine IDs in the predetermined set of machine IDs; and
transmitting an alert indicating that at least one machine associated with the plurality of machine IDs having the top-k probability values has likely produced the anomalous audio waveform.

10. The system of claim 9, wherein the operations further comprise:
processing, using the trained encoder neural network in accordance with the adjusted values of the encoder parameters, the extracted new audio features to generate new latent embeddings;
processing, using the trained decoder neural network in accordance with the adjusted values of the decoder parameters, the new latent embeddings to generate new reconstructed audio features;
determining a distance error between the new reconstructed audio features and the extracted new audio features;
determining that the distance error exceeds a predetermined threshold; and
in response to a determination that the distance error exceeds the predefined threshold, determining that the new audio waveform is anomalous.

11. The system of claim 9, wherein the operations further comprise:
automatically triggering a maintenance process to maintain the plurality of machines associated with the machine IDs having the top-k probability values.

12. The system of claim 9, wherein the encoder neural network comprises a plurality of dense neural network layers for down sampling the augmented features.

13. The system of claim 9, wherein the decoder neural network comprises a plurality of dense neural network layers for up sampling the augmented features.

14. The system of claim 13, wherein each of the plurality of dense neural network layers of the decoder neural network is followed by a concatenation layer.

15. The system of claim 9, wherein the augmented features are represented by a feature vector of size (T, 193), where T is a time dimension of the audio waveform.

16. One or more non-transitory computer readable media encoded with instructions that, when executed by one or more computers, cause the one or more computers to perform operations for training an anomaly detection neural network comprising an encoder neural network, a decoder neural network, and a convolutional neural network, wherein the encoder neural network has encoder parameters, the decoder neural network has decoder parameters, and the convolutional neural network has convolutional parameters, the operations comprising:
receiving training data comprising a plurality of training samples, each training sample including (i) a training audio waveform that represents an audio signal and (ii) a machine identity (ID) associated with a machine that produced the audio signal;
for each training sample of the plurality of training samples, performing the following steps:
processing the training audio waveform to extract a plurality of training audio features;
obtaining, using a sensor, an environmental noise audio waveform;
processing the environmental noise audio waveform to extract a plurality of noise features;
generating augmented features by combining the plurality of extracted training audio features and the plurality of noise features;
processing, using the encoder neural network in accordance with current values of the encoder parameters, the augmented features to generate a plurality of latent embeddings;
processing, using the decoder neural network in accordance with current values of the decoder parameters, the plurality of latent embeddings to generate reconstructed audio features;
processing, using a convolutional neural network in accordance with current values of the convolutional parameters, the augmented features to generate a predicted machine ID probability distribution, wherein the predicted machine ID probability distribution comprises, for each machine ID in a predetermined set of machine IDs, a probability value indicating a likelihood that the training audio waveform was produced by a machine associated with the corresponding machine ID; and
adjusting, through backpropagation, the current values of the encoder parameters, the current values of the decoder parameters, and the current values of the convolutional parameters to minimize an objective function,
wherein the objective function comprises a reconstruction loss and a cross-entropy loss, wherein the reconstruction loss represents a discrepancy between the reconstructed audio features and the extracted training audio features, and wherein the cross-entropy loss represents a discrepancy between the predicted machine ID distribution and a ground truth machine ID;
receiving a new audio waveform;
processing the new audio waveform to extract new audio features;
processing, using the convolutional neural network in accordance with the adjusted values of the convolutional parameters, the extracted new audio features to generate a new predicted machine ID probability distribution, wherein the new predicted machine ID probability distribution comprises, for each machine ID in the predetermined set of machine IDs, a probability value indicating a likelihood that the new audio waveform was produced by a machine associated with the corresponding machine ID;
selecting, based on the new predicted machine ID probability distribution, a plurality of machine IDs having the top-k probability values among the machine IDs in the predetermined set of machine IDs; and
transmitting an alert indicating that at least one machine associated with the plurality of machine IDs having the top-k probability values has likely produced the anomalous audio waveform.

* * * * *